March 15, 1927. 1,620,740
D. M. SIMONS
APPARATUS FOR BUILDING JOINTS
Filed April 8, 1926   2 Sheets-Sheet 2
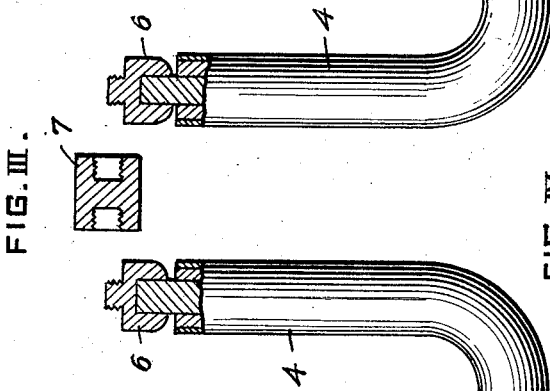
FIG. III.
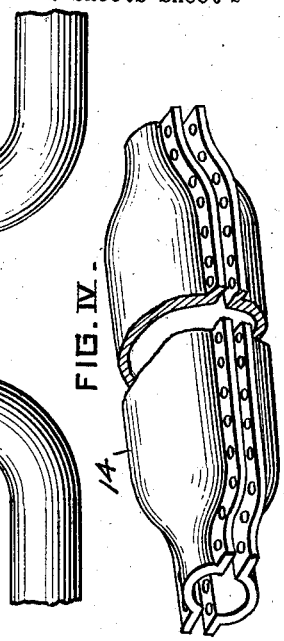
FIG. IV.
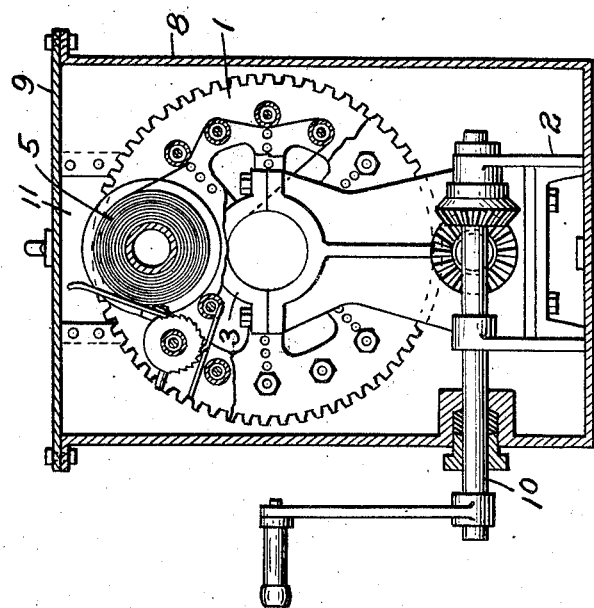
FIG. II.
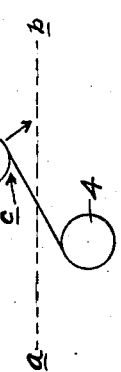
FIG. V.
WITNESSES
J. Herbert Bradley
Percy a English
INVENTOR
Donald M. Simons
by Christy and Christy
his attorneys Patented Mar. 15, 1927.

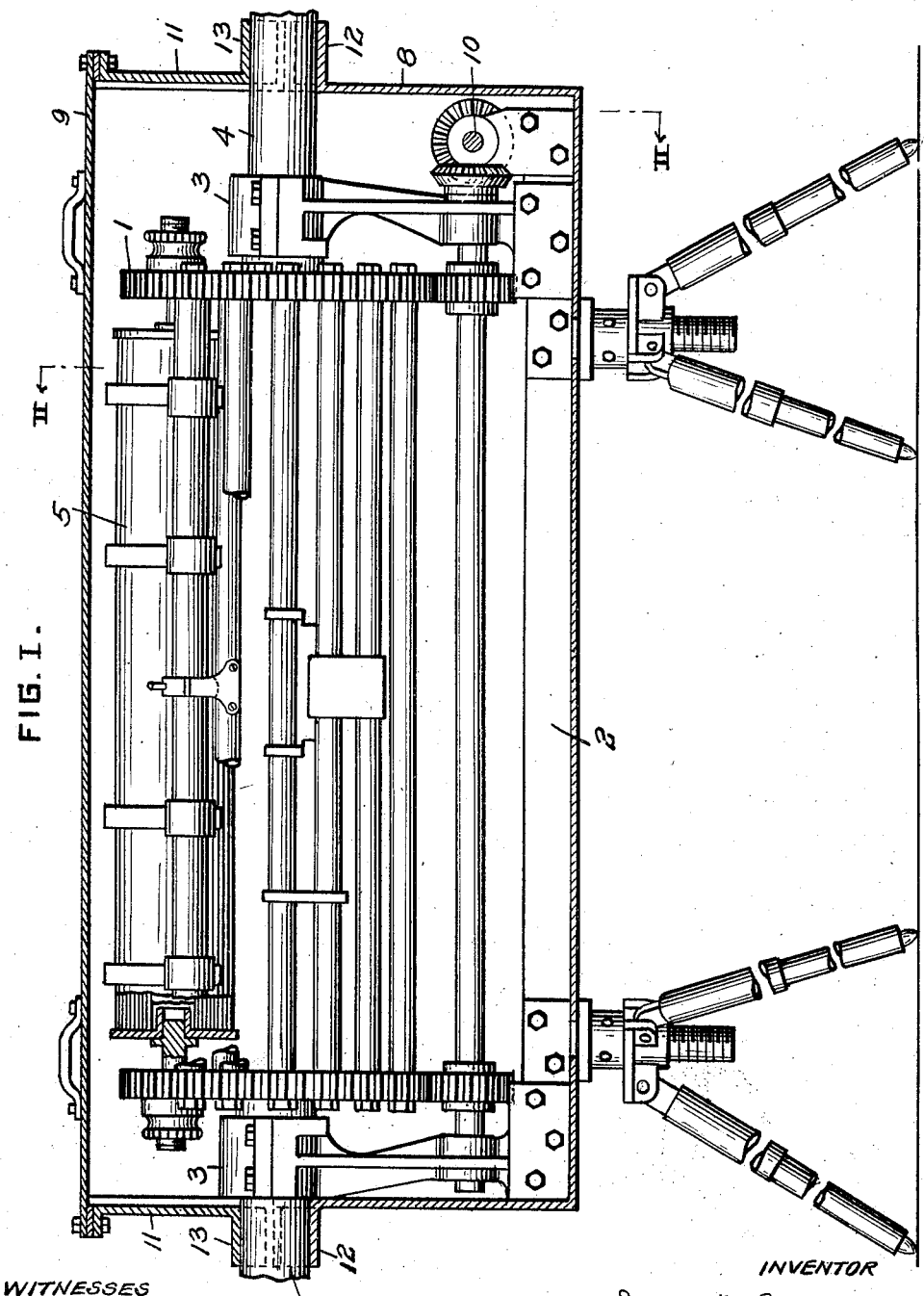

1,620,740

UNITED STATES PATENT OFFICE.

DONALD M. SIMONS, OF OSBORNE, PENNSYLVANIA, ASSIGNOR TO STANDARD UNDERGROUND CABLE COMPANY, OF PITTSBURGH, PENNSYLVANIA, A CORPORATION OF PENNSYLVANIA.

APPARATUS FOR BUILDING JOINTS.

Application filed April 8, 1926. Serial No. 100,591.

My invention relates to the installation of electric cables and consists in improvements in apparatus for building joints.

An oil-filled cable is one whose insulation consists of or contains material which at the temperature of installation is fluid. This fluid material may be present in the cable structure as a free body or layer of insulation, or it may be present in association with other insulation; for instance, it may be more or less completely absorbed by a body of porous or fibrous insulation. In the building of cables for particular kinds and conditions of service, it is in some cases desirable, for electrical reasons, to use insulating compound which even at ordinary temperatures is liquid; or, again, a given cable, containing a compound which at ordinary atmospheric temperature would not flow, may be installed in a hot country or in a hot location, and at a temperature at which the compound would flow. I cite as an instance of an oil-filled cable, but only as an instance, and not by way of limitation, the cable shown and described in Letters Patent of the United States No. 1,574,076, granted February 23, 1926, on the application of Henry W. Fisher.

In making installation of an oil-filled cable, it is necessary that there be no escape of the insulating compound, whether it be present as a free body of oil, or as a body more or less completely absorbed in a body of porous or fibrous insulation. And, specifically, in jointing together successive lengths of oil-filled cable, it is necessary that there be no running away of the fluid insulation, when the outer covering of the cable is removed.

My invention is found in the apparatus shown in the accompanying drawings. Fig. I is a view in vertical and medial section through a certain tank, showing in elevation certain contained mechanism; Fig. II is a view in transverse section, on the broken plane indicated at II—II, Fig. I; Fig. III is a diagrammatic showing, in illustration of a certain step in procedure; Fig. IV is a view in perspective of a certain sleeve; Fig. V is a diagrammatic illustration of a certain step in the procedure.

I have for purposes of illustration shown as incidental to the practice of my invention, the joint-building machine of my now pending application, filed August 29, 1925, Serial No. 53,306. This joint-building machine includes a drum 1, borne in a suitable frame 2 and rotatable on its axis. The drum is axially perforate and the frame is provided with clamping members 3, adapted to engage two cable ends 4, and to hold them secure while a joint is being built between and upon them. The drum carries a spool 5, upon which a web of sheet insulation is wound, and from which in the operation of the machine the sheet of insulation is taken and wrapped upon the united cable ends. Such a machine may conveniently be employed in the practice of my present invention.

This machine in the practice of my present invention is contained within a tank 8 with a removable lid 9. The tank is such in character as to receive and contain a body of oil, submerging the drum at least to a point above its axis, and submerging a cable previously brought to place in the drum. Through a properly packed orifice in the wall of the tank, the crank shaft 10 extends, by means of which the drum is rotated. The tank in its end walls is provided with deep notches or recesses, in which the closure plates 11 are removably secured, and these closure plates are adapted to be united to the tank walls in liquid-tight union. The end walls and the closure plates 11 are provided with companion half-cylindrical sleeves 12 and 13, which when a cable is in place and the plates 11 are in place, may be clamped in liquid-tight engagement one upon another, and each upon the outer surface of an introduced cable body 4. The tank may additionally be provided with connections for the introduction of and the drawing off of oil; but, since such provisions are in no sense essential to normal operation, I do not show them.

My invention has to do, as I have said, with the jointing of oil-filled cables. Such cables when prepared for laying are sealed at the ends. When a joint is to be made, the seal is necessarily broken, and the problem is, how to open the ends, effect the union, and complete the joint, without escape of oil and consequent ingress of air to the cable structure.

In the practice of my invention I open the sealed cable ends under oil, effect under oil the electrical union of the conductors, and while still under oil enclose the union properly insulated in a liquid-tight and mechanically secure joint structure, and then remove the joint from immersion. It may then be in finished condition, or further building may be done to render the joint fully and permanently serviceable. I shall describe in detail a particular procedure.

Referring, first, to Fig. III, I provide a union for the cable conductor itself, such as is shown and described in my pending application for Letters Patent of the United States, filed March 19, 1925, Serial No. 16,731. It consists essentially of two thimbles 6 and a uniting body 7. The thimbles are socketed and are adapted to be electrically united, as by being sweated to place, upon the ends of the cable conductors, and the two thimbles which constitute a pair and the companion uniting body are screw-threaded, and the ends of the two engagements are oppositely turned, so that when the uniting body is brought between the axially aligned thimbles, rotation of the uniting body will effect the union.

In Fig. III two cable ends to be united are indicated at 4. Let it be understood that these are ends of lengths of oil-filled cable, and that a joint is to be made between them. The ends, of course, are sealed. In the practice of my invention I conveniently proceed in the following manner. I first turn these ends to the vertical position indicated, and while they are in such position, I remove the seal, cut away sheath and insulation to expose the conductor-ends sufficiently. Upon the exposed conductor-ends I sweat the two thimbles 6 of the union, whose character I have indicated. I then cap the cable ends again. The cap may be a tight-fitting rubber cap, bound around the cable-ends and around the thimbles secured thereto, or it may be any suitable cap which will form a secure closure of the cable end again, preventative of the escape of oil and of the ingress of air into the cable structure.

While still the cable ends are accessible, the sheath may be scored and partially cut through, where complete cutting-away is to be effected, incidentally to the building of the joint.

When these preliminary steps have been taken, the cable ends bent straight again may be introduced to the joint-building machine, particularly illustrated in Figs. I and II. The tank is at this time empty and the closure plates are removed. The cable-ends, introduced into the machine, are brought to position, and are clamped to place in the frame 2 by the application and the securing of the clamping plates 3. The closure plates 11 of the end walls of the tank are then brought to position and secured, and when this has been done the tank walls will be closed in liquid-tight engagement around the cable bodies 4. Oil is then introduced and the tank is filled, to the extent at least that the included cable ends are completely submerged.

As I have said in my application mentioned above, Serial No. 53,306, and as the drawings in this case clearly indicate, the apparatus here shown is intended for field service,—for joint-building is essentially a field operation. The oil then, which ordinarily will be clean, dry transformer oil, will be available, borne by truck, and, when the apparatus is ready, the truck is drawn up and the oil is run in.

When the cable-ends within the tank have so been submerged in oil, the rubber caps or other temporary closures are taken away, the uniting body 7 is brought to position and screwed to place, uniting electrically the two conductor ends.

The score cuts in the lead sheath are then cut through, and the cut-away lead is removed. It is convenient that, up to this point at least in the progress of the operation, the volume of oil within the tank be little more than sufficient to submerge the cable ends. The cutting then may be done by plunging no more than the end of the tool beneath the surface of the oil.

I have described the trimming away of the cable sheath by hand. Instead, the drum equipped with knives, as described in my application Serial No. 53,306, may be employed, to cut the sheath and the underlying machine-laid insulation as well.

When the drum is to be brought into operation, whether to trim the cable ends or to apply the wrapping of paper in building out the joint, or both, the depth of oil within the tank may be increased to the desired maximum.

The wrapping-on of paper around the united conductor ends and between the cut-away ends of machine-laid insulation and of cable sheath, and the building out to larger diameter of an envelope of wrapped-on paper, bearing flaring screens of conducting material electrically continuous with the cut-away ends of the cable sheath, are matters fully described in the specification of my application, Serial No. 53,306, and these matters in their details are not part of my present invention. Suffice it to say here that the united conductor ends are, while submerged in insulating liquid, suitably covered by a permanently applied body of insulation; and that, in the operation of the machine which here is shown by way of example, this permanently applied body of insulation consists in a wrapping of paper or other suitable material.

Incidental to or sequent upon the enveloping of the united conductors within a permanently applied body of insulation, a split metallic sleeve, such as that indicated at 14, Fig. IV, may be applied under oil and bolted to place, effecting liquid-tight closure around the joint and upon the cable sheath at either side and adjacent the joint. The oil within the tank and external to the sleeve may now be drawn off, and the cable with the thus far completed joint may be removed from the machine and from the tank—or, as commonly will be the fact, tank and machine are taken away from the jointed cable. For certain installations the structure thus far described constitutes a completed joint. Ordinarily, however, an outer sleeve is applied. This outer sleeve may be the familiar lead sleeve, initially slipped over one of the cable ends, and now brought to place, shaped at the end, and united by wiped-solder joint to the cable sheath on either side of the union. This outer sleeve, however, may be formed and applied as desired.

The space between inner and outer sleeves will ordinarily be filled with insulating material, applied in liquid condition.

The cover 9 with which the tank 8 is provided, is a cover adapted to be bolted to place upon a gasket, so as to form a water-tight joint. As already I have intimated, the joint building of the invention will ordinarily be performed in the field, and the provision of a water-tight closure is a practical necessity, to exclude rain on occasion, or to leave safe over-night a partly completed job.

Electric lights may be provided within the tank, and, during operation, submerged, to afford illumination. The tank may be heated by suitable means, to bring to desired condition of fluidity a more viscid insulating oil, or for other purposes. In such case the cutting of cable sheath and of machine-laid insulation may be effected either by mechanically operated knives or by knives held manually above but with cutting blades thrust beneath the surface of the oil.

If in its planetary movement the roll of paper upon the spool of the machine be caused alternately to emerge from and to plunge again into the bath of oil, the direction of winding of the paper on the spool will preferably be such that the formation of an air pocket is avoided between the roll of paper still on the spool and the web which is being drawn in tangential path from it. This point is illustrated in Fig. V, in which the direction of swing of the spool 5 in its orbit around the cable structure 4, is indicated by an arrow. The surface of the bath of oil is indicated by the dotted line $a$—$b$. And it will be observed that as the spool 5 plunges beneath the surface no such air pocket is formed as would be the case at the point $c$, were the direction of rotation reversed.

In this specification and incidental to the description of the apparatus and its operation which constitute the subject-matter of this invention, I have described the surrounding of the joint in a plurality of sleeves, the inner sleeve being full of oil when the outer sleeve is by wiped-solder joint united to the cable sheath. This particular structure of cable joint and this method of jointing cables is a matter of distinct invention, and is made the subject-matter of an application filed by me October 25, 1926, Serial No. 143,864.

I claim as my invention:

1. In apparatus for jointing oil-filled cables a tank, means for introducing a length of cable in liquid-tight penetration through the tank walls, and means arranged within the tank for wrapping insulation upon a length of cable in place within the tank.

2. In apparatus for jointing oil-filled cables a tank with opposite recessed walls, closures for the recesses in the walls adapted to be applied in liquid-tight engagement upon the surface of a cable body introduced through such recesses, and means arranged within the tank for wrapping insulation upon a length of cable body in place within the tank.

3. In apparatus for jointing oil-filled cables an open-topped tank, means for introducing a length of cable in liquid-tight penetration through opposite tank walls, means arranged within the tank for wrapping insulation upon a length of cable in place within the tank, and a water-tight closure applicable to the tank when a length of cable is in place as aforesaid.

In testimony whereof I have hereunto set my hand.

DONALD M. SIMONS.